United States Patent [19]

Butkovich et al.

[11] Patent Number: 5,658,087

[45] Date of Patent: Aug. 19, 1997

[54] LOCKING MECHANISM FOR RELEASABLY RETAINING A POWER TAKE-OFF SHAFT WITHIN AN OUTPUT SHAFT HUB

[75] Inventors: George M. Butkovich, Lemont; Marvin A. Prickel, Woodridge; George R. Vater, Clarendon Hills, all of Ill.; Kenneth Clayburn, Doncaster, England

[73] Assignee: Case Corporation, Racine, Wis.

[21] Appl. No.: 575,289

[22] Filed: Dec. 20, 1995

[51] Int. Cl.[6] ........................................... B25G 3/28
[52] U.S. Cl. ........................ 403/359; 403/2; 403/328; 464/32
[58] Field of Search ........................... 403/2, 326, 328, 403/359; 192/48.91, 34, 89.27, 96; 464/32, 30

[56] References Cited

U.S. PATENT DOCUMENTS

| | | | |
|---|---|---|---|
| 2,579,382 | 12/1951 | Gattiker, Jr. et al. | 403/328 |
| 3,065,011 | 11/1962 | De Pew | 403/328 |
| 3,073,192 | 1/1963 | Beers | 403/328 X |
| 3,513,712 | 5/1970 | Zajichek et al. | 74/15.2 |
| 3,561,277 | 2/1971 | Boyle et al. | 74/15.4 |
| 3,688,885 | 9/1972 | Cummings | 192/34 X |
| 3,715,701 | 2/1973 | Boyle et al. | 74/15.4 |
| 3,747,966 | 7/1973 | Wilkes et al. | 287/119 R |
| 3,991,629 | 11/1976 | Dearnley | 74/15.4 |
| 4,271,942 | 6/1981 | Ballendux | 192/48.91 |
| 4,287,778 | 9/1981 | Quick | 74/15.4 |
| 4,435,990 | 3/1984 | Chalmers | 74/15.63 |
| 4,463,696 | 8/1984 | Steckenrider | 112/200 |
| 4,546,661 | 10/1985 | Weis et al. | 74/15.4 |
| 4,575,274 | 3/1986 | Hayward | 403/2 |
| 4,617,844 | 10/1986 | Batten | 403/359 X |
| 4,685,340 | 8/1987 | Shust et al. | 74/11 |
| 4,685,550 | 8/1987 | Metcalf | 192/96 X |
| 4,776,226 | 10/1988 | Zenker | 74/15.4 |
| 4,859,110 | 8/1989 | Dommel | 403/325 |
| 4,960,344 | 10/1990 | Geisthoff et al. | 403/316 |
| 4,988,248 | 1/1991 | Flux | 403/328 X |
| 5,186,079 | 2/1993 | Gee | 403/2 X |
| 5,326,186 | 7/1994 | Nyberg | 403/328 X |
| 5,518,335 | 5/1996 | Dobbins | 403/328 |

FOREIGN PATENT DOCUMENTS 1400895 10/1996 Germany ........................... 403/359

OTHER PUBLICATIONS

"Reversible PTO Shaft" product brochure (Mar. 1992).

*Primary Examiner*—Kenneth J. Dorner
*Assistant Examiner*—Bruce A. Lev
*Attorney, Agent, or Firm*—Rudnick & Wolfe

[57] ABSTRACT

A locking mechanism for releasably fixing an externally splined power take-off shaft to an output shaft of off-highway equipment such as a tractor. The output shaft has a hollow, internally splined hub portion adapted to axially receive the externally splined power take-off shaft to prevent relative rotational movement between the power take-off and output shafts. The locking mechanism includes a locking member supported within a radial opening in the power-take off shaft so as to be radially movable between an outer locking position and an inner unlocking position. In the outer locking position, the locking member is engageable with a recess formed in the hub portion of the output shaft to prevent relative axial movement between the power take-off shaft and the output shaft. In the inner unlocking position, the locking member is disengaged from the recess in the output shaft to permit such relative axial movement. An elongated actuator is positioned within an inner bore of the power take-off shaft and has a cam surface thereon. The actuator is movable between a first position in which the actuator operably maintains the locking member in its locking position, and a second position which permits radial movement of said locking member to its unlocking position. Upon return of the actuator to the first position, the cam surface operably engages the locking member to move the locking member to its locked position.

32 Claims, 6 Drawing Sheets

LOCKING MECHANISM FOR RELEASABLY RETAINING A POWER TAKE-OFF SHAFT WITHIN AN OUTPUT SHAFT HUB

FIELD OF THE INVENTION

The present invention relates generally to a two-speed drive power take-off assembly for an agricultural tractor, and more particularly, to a locking mechanism for releasably fixing interchangeable power take-off shafts to an output shaft which is selectively driven at two different speeds via mechanical gearing.

BACKGROUND OF THE INVENTION

Utilization of a power take-off (PTO) shaft on equipment such a tractor or the like to power associated agricultural implements is commonly known in the industry. Typically, the PTO shaft is coupled to an output shaft which is selectively driven through mechanical gearing at standardized speeds of either 540 rpm or 1000 rpm. The PTO shaft is configured for connection to an implement which is also designed to be operated at either 540 rpm or 1000 rpm.

In order to avoid connecting to implements for operation at the wrong speed, a power take-off shaft is typically configured with a standard 1⅜ inch diameter connection having six splines for connecting to 540 rpm implements, and/or 21-splines for connecting to 1000 rpm implements. Alternatively, some PTO shafts are configured with a standard 1¾ inch diameter connection having 20 splines for connecting to 1000 rpm implements having similarly configured coupling mechanisms.

Thus, in order to accommodate the requirements of a particular implement, it is necessary to provide a power take-off assembly which allows quick and easy conversion to the desired PTO shaft configuration and associated speed of operation.

Various mechanisms have been employed for converting to a desired PTO shaft configuration. Some prior art devices utilize interchangeable PTO shafts having six tooth or 21 tooth splines for accommodating the desired output speed, while other devices utilize a single reversible PTO shaft having six tooth and 21 tooth spline ends extending in opposite axial directions.

Such PTO shafts are often maintained in place by an external snap-ring configured to engage an interior bore of the output shaft. Other known PTO shafts are maintained in place by a flanged locking mechanism arranged externally of the output shaft to which the PTO shaft is coupled.

One disadvantage of the PTO shafts with connecting flanges is that the flange adds to the overall length of the power take-off unit. Such excess length may be unacceptable in view of standards imposed by the agricultural industry. The excess length of the PTO shaft can also create instability of a tractor because the resulting hitch connection to an implement effects the load on the front axle of the tractor. Moreover, it also tends to be tedious and time consuming to connect the flange to the output shaft by bolts or the like.

When snap-rings are used to connect the PTO shafts to the output shafts, special tools are required to interchange the PTO shaft, which tends to be cumbersome and time consuming. The location of the snap-rings may add to this difficulty because they are exposed to debris, especially in the dirt and mud-filled environment of a farming field, thus making it difficult to properly use the tools. In addition, the connection may not be secure enough to adequately retain the PTO shaft during high speed operation. As will be appreciated by those skilled in the art, the PTO shaft is subjected to axial forces during operation of the agricultural implement. Accordingly, the snap-rings used to releasably fasten the PTO shaft in place may have insufficient strength to retain the PTO shaft in place.

It therefore remains desirable to provide a simple, compact locking mechanism for quickly and securely connecting a desired PTO shaft to the output shaft.

Various efforts have also been undertaken to correlate the desired PTO shaft speed with the connection of the PTO shaft to the output shaft. One such device utilizes a reversible PTO shaft having different length splined end portions. In either orientation, the outer end portion is adapted for engagement with the implement for the selected speed, while the inner end portion positions a hydraulic valve to allow pressurized fluid to engage a clutch associated with the proper drive gear. Another such device utilizes interchangeable PTO shafts having different lengths for displacing a cammed shaft a desired amount, thereby actuating clutch shifting elements to selectively engage the proper drive gear.

These types of mechanisms tend to be rather complex, thus reducing the efficiency of shifting between the high and low gears, which may decrease the reliability of the mechanism over time and require excess maintenance. In addition, the complexity of these types of mechanisms can add to the overall size and length of the power take-off unit. It therefore remains desirable to provide a simple, compact mechanism which automatically shifts gears in response to interchanging the PTO shaft.

SUMMARY OF THE INVENTION

In view of the above, and in accordance with one aspect of the present invention, there is provided a locking mechanism for releasably fixing an externally splined power take-off shaft to an output shaft of off-highway equipment such as a tractor. The output shaft has a hollow, internally splined hub portion adapted to axially receive the externally splined power take-off shaft to prevent relative rotational movement between the power take-off and output shafts. The locking mechanism includes a locking member supported within a radial opening in the power-take off shaft so as to be radially movable between an outer locking position and an inner unlocking position. In the outer locking position, the locking member is engageable with a recess formed in the hub portion of the output shaft to prevent relative axial movement between the power take-off shaft and the output shaft. In the inner unlocking position, the locking member is disengaged from the recess in the output shaft to permit such relative axial movement. An elongated actuator is positioned within an inner bore of the power take-off shaft and has a cam surface thereon. The actuator is movable between a first position in which the actuator operably maintains the locking member in its locking position, and a second position which permits radial movement of said locking member to its unlocking position. Upon return of the actuator to the first position, the cam surface operably engages the locking member to move the locking member to its locked position.

In another aspect of the present invention, a connector interconnects the power take-off shaft and output shaft and is configured to break when binding of the power take-off shaft prevents rotation thereof with the positively driven output shaft. In one form of the invention, the connector sleeve has internal and external splines forming a sliding spline connection with the external splines on the power take-off shaft and the internal splines on the output shaft, respectively, to prevent relative rotational movement. The internal and external splines of the connector sleeve are longitudinally spaced relative to each other to create an unsplined ring portion of the connector sleeve. The unsplined ring portion has a circumferential relief notch formed therein such that the connector sleeve fails at the relief groove when binding of the power take-off shaft prevents rotation thereof with the positively driven output shaft.

In a preferred embodiment of the locking mechanism, the actuator is configured as a locking pin and the cam surface is configured as a circumferential channel formed on an end portion of the locking pin. The locking member preferably includes three circumferentially spaced balls supported within respective equally spaced radial openings in the power take-off shaft. In addition, the recess in the hub portion of the output shaft is defined as a circumferential groove preferably having a radius of curvature substantially the same as the radius of said locking balls.

In operation, the locking balls are simultaneously radially movable between the outer locking position and the inner unlocking position. In the outer locking position, the locking balls engage the groove in the output shaft to prevent relative axial movement between the power take-off shaft and the output shaft. In the inner unlocking position, the locking balls disengage from the groove and move within the channel in the locking pin to permit such relative axial movement.

Preferably, the locking member is biased under the influence of a spring toward the first position in which the locking balls are in their outer locking positions. In a most preferred embodiment, the spring surrounds a proximal portion of the locking pin and is interposed between a proximal shoulder of the PTO shaft bore and a shoulder of the locking pin located distally of the proximal shoulder.

Also preferably, the circumferential channel in the locking pin is defined by curved distal and proximal wall portions which converge toward a center neck portion having a generally uniform diameter. The width of the channel is preferably greater than the axial width of the radial opening in the power take-off shaft so that the locking balls can rest on the neck portion in the unlocking position. When the locking pin is released, the curved distal wall portion operably engages the locking balls and acts as a cam to move the balls radially outwardly within the openings in the power take-off shaft, thereby placing the locking balls into engagement with the groove in the output shaft.

The present invention provides significant advantages over other power take-off units. One advantage is the ability to quickly and easily remove the power take-off shaft without the use of tools by merely pressing the locking pin and pulling the power take-off shaft from the output shaft. Another power take-off shaft can be just as easily and quickly inserted and securely locked within the output shaft. The positioning of the locking mechanism inside the power take-off shaft also provides a compact assembly which minimizes the overall size and length of the power take-off unit. In addition, the configuration of the interchangeable PTO shafts provide a fast and reliable way to automatically shift gears between high and low operating speeds.

The breaksaway aspect of the present invention also provides significant advantages over other power take-off units. The use of a connector sleeve which is configured to fail before the PTO shaft and output shaft may prevent damage to the components of the PTO unit.

The present invention, together with further objects and advantages, will be best understood by reference to the following detailed description taken in conjunction with the accompanying drawings.

BRIEF DESCRIPTION OF THE DRAWINGS

FIG. 2A is a cross-sectional view taken along the line 2A—2A in FIG. 2 and showing locking balls in the radially outward locking position;

FIG. 2B is an enlarged partial view of a locking pin of the present invention showing a cam surface defining a circumferential channel;

FIG. 3A is a cross-sectional view of the power take-off shaft taken along the line 3A—3A in FIG. 3;

FIG. 3B is a fragmentary enlarged view of a distal end portion of the power take-off shaft showing the locking pin axially displaced by a cap screw;

DETAILED DESCRIPTION OF THE PREFERRED EMBODIMENT

Figure 1:
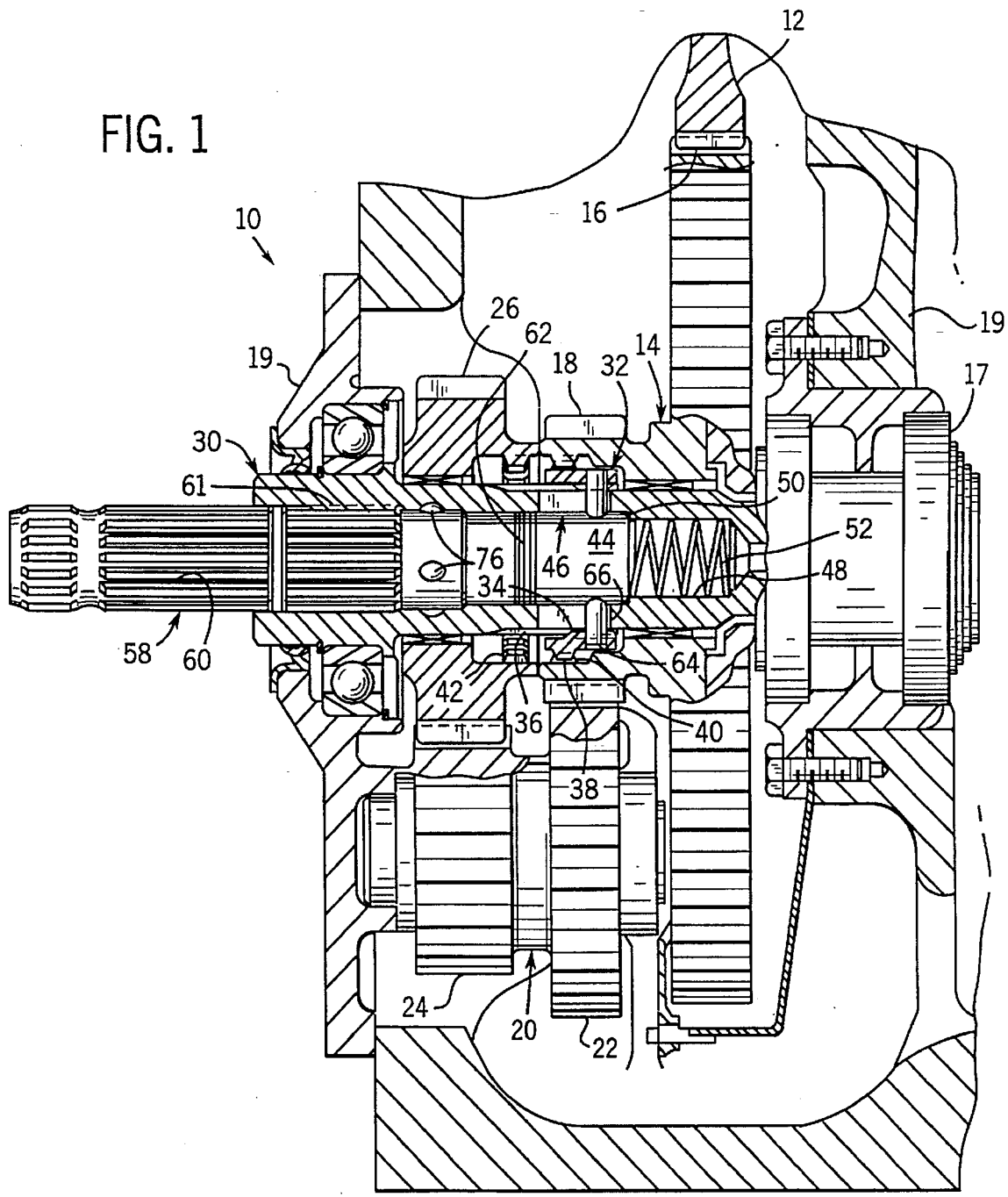
FIG. 1 is a partial cross-sectional view of a power take-off unit showing a 1000 RPM power take-off shaft in a locked position.

While the present invention is susceptible of embodiments in various forms, there is shown in the drawings and will hereinafter be described a preferred embodiment of the invention with the understanding that the present disclosure is to be considered as setting forth an exemplification of the invention which is not intended to limit the invention to the specific embodiment illustrated.

Referring now to the drawings, wherein like reference numerals refer to like parts throughout the several views, there is shown in FIG. 1 a power take-off assembly 10. The engine of a tractor drives the system through an engine clutch and a drive shaft (not shown). When the engine clutch is engaged, a drive gear 12 drives a high speed cluster gear 14 including gears 16 and 18 at a constant speed of about 1000 rpm. The high speed cluster gear 14 is rotatably supported in a bearing assembly 17 in a power take-off housing 19.

An intermediate cluster gear 20 having an axis parallel to that of the high speed cluster gear 14 is also rotatably mounted in the housing 19. The intermediate cluster gear 20 includes gears 22 and 24 of which gear 22 is driven by gear 18 of the high speed cluster gear 14. Thus, the high speed cluster gear 14 is driven through gear 16, which in turn drives gear 22 of the intermediate cluster gear 20 through gear 18. The gear 24 of the intermediate cluster gear 20 drives a low speed gear 26 which results in a 540 rpm operating speed. The low speed gear 26 is rotatably mounted within an output shaft 30 and is adjacent to and in axial alignment with the high speed gear 18. When the engine clutch is engaged, the high speed gear 18 of cluster gear 14 and the low speed gear 26 are continuously driven such that either can provide rotatable power to drive the power take-off assembly 10.

Figure 2:
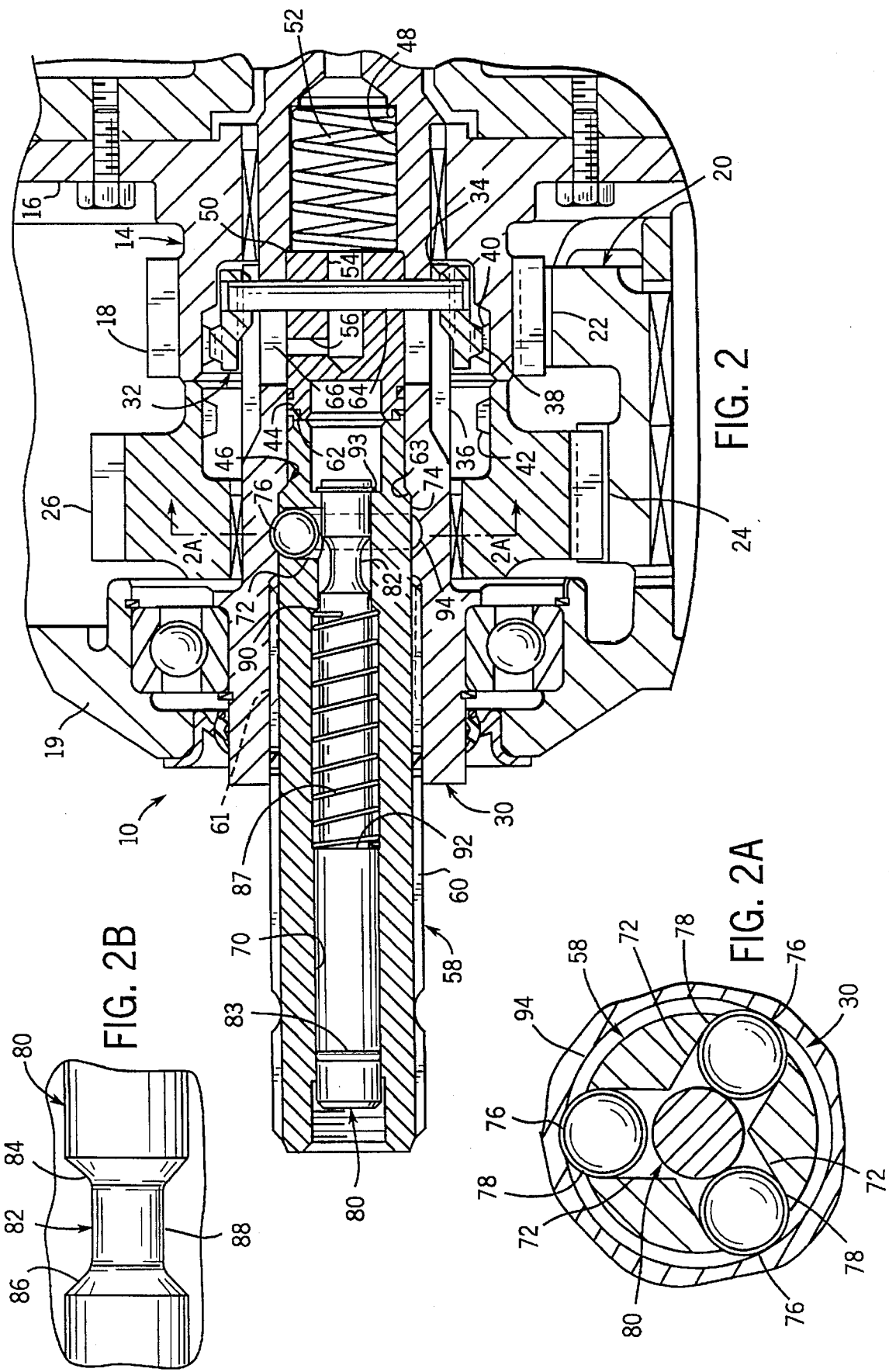
FIG. 2 is an enlarged cross-sectional view of the power take-off unit shown in FIG. 1 illustrating the locking mechanism of the present invention and showing a locking ball in a radially outward locking position and a shift collar in engagement with a 1000 RPM gear.

As shown in FIG. 2, a distal end portion of the output shaft 30 is rotatably mounted to the housing 19 and a proximal end portion is supported within the high speed cluster gear 14. To selectively engage one of the gears 14, 26 to positively drive the output shaft 30, an axially shiftable clutch collar 32 is carried by the output shaft 30. The clutch collar 32 has internal spline teeth 34 forming a sliding spline connection with external spline teeth 36 on the output shaft 30. The clutch collar 32 also has external clutch teeth 38 adapted to operably engage internal clutch teeth 40 or 42 on the respective high and low speed gears 18 and 26. Thus, the clutch collar 32 can be displaced axially so that either the high speed gear 18 or low speed gear 26 drives the output shaft 30 at 1000 rpm or 540 rpm respectively. As will be appreciated by those skilled in the art, the clutch collar 32 can be configured so that the internal teeth 34 are in general alignment with the external teeth 38 rather than being offset as shown in FIGS. 2–6.

To move the clutch collar 32 into engagement with the desired speed gear, the clutch collar 32 is preferably configured with a cylindrical piston 44 which is slidably positioned within a hollow hub portion 46 of the output shaft 30. In the illustrated embodiment, the hollow hub portion 46 of shaft 30 includes a reduced diameter spring chamber 48 formed in a proximal end thereof. The hub portion 46 and spring chamber 48 define a radial step or shoulder 50 therebetween which limits axial movement of the clutch collar 32 if the piston 44 is forced against the shoulder 50. As seen in FIG. 2, the clutch collar 32 is biased in a distal or leftward direction by a spring 52 which is positioned within the chamber 48 and acts against the piston 44 of the clutch collar 32. In a preferred embodiment, a longitudinal passage 54 and radial passageway 56 are formed in the piston 44 of the clutch collar 32 for receiving lubricating fluid through the spring chamber 48 of the output shaft 30.

The position of the clutch collar 32 is selectively determined by the configuration of an interchangeable PTO shaft 58 which is axially received within the hollow hub portion 46 of the output shaft 30. As shown in FIG. 2, the PTO shaft 58 has external splines 60 forming a sliding spline connection with internal splines 61 on the output shaft 30 to prevent relative rotational movement between the PTO shaft 58 and output shaft 30. The PTO shaft 58 illustrated in FIGS. 1–4 has a length adapted to place the clutch collar 32 into engagement with the high speed gear 18.

When the PTO shaft 58 is in a locked position as shown in FIGS. 1 and 2, a proximal or right end 62 bears against the piston 44 of the clutch collar 32. As noted above, the radial step or shoulder 50 of the output shaft 30 limits the rightward axial movement of the piston 44. Similarly, an intermediate shoulder 63 of the output shaft 30 limits the rightward axial movement of the PTO shaft 58. The axial movement of the clutch collar 32 is further limited in each axial direction by a slide pin 64 extending from the piston 44. The slide pin 64 is axially slideable in a pair of longitudinal slots 66 formed in the output shaft 30. As will be discussed in more detail below, a locking mechanism is also provided for automatically locking the PTO shaft 58 into the locking position shown in FIG. 2, thereby securely maintaining the clutch collar 32 in the desired position for engagement with the high speed gear 18.

Figure 3:
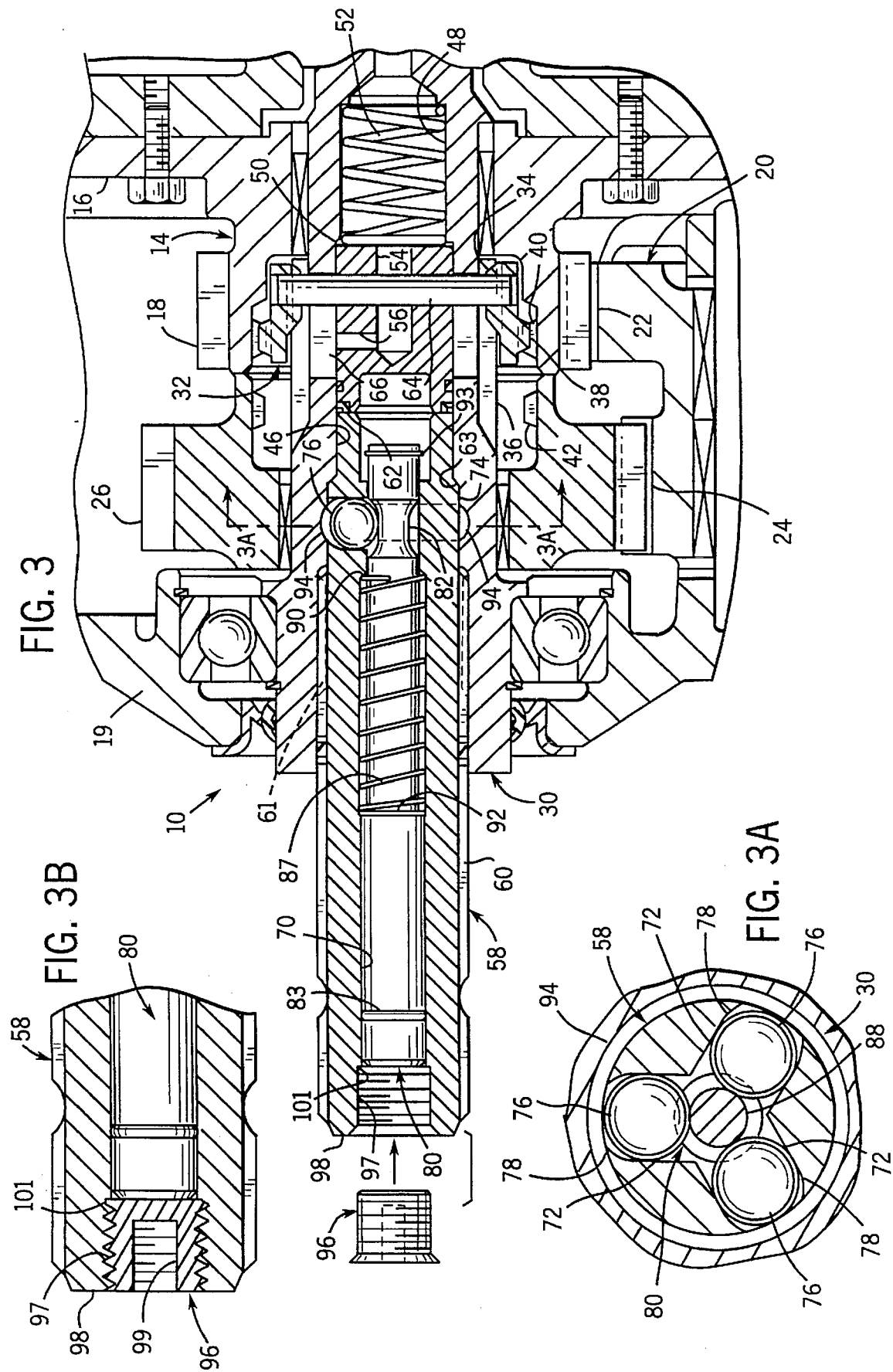
FIG. 3 is the cross-sectional view of the power take-off unit shown in FIG. 2 and illustrating the locking balls of the present invention in a radially inward unlocking position.
Figure 4:
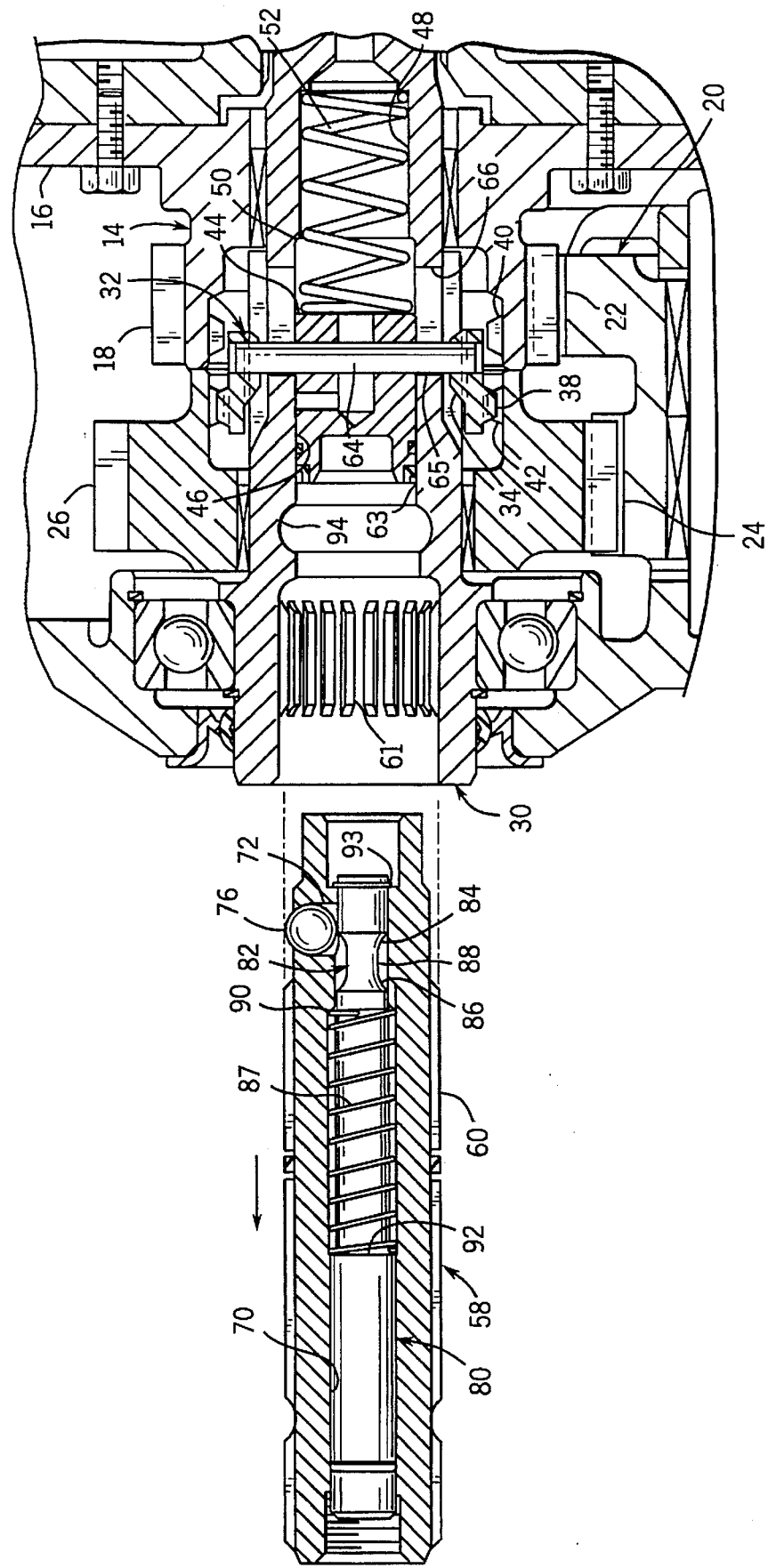
FIG. 4 is a cross-sectional view of the power take-off unit showing the power take-off shaft assembly removed from the output shaft and the shift collar displaced axially into engagement with a 540 RPM gear.
Figure 5:
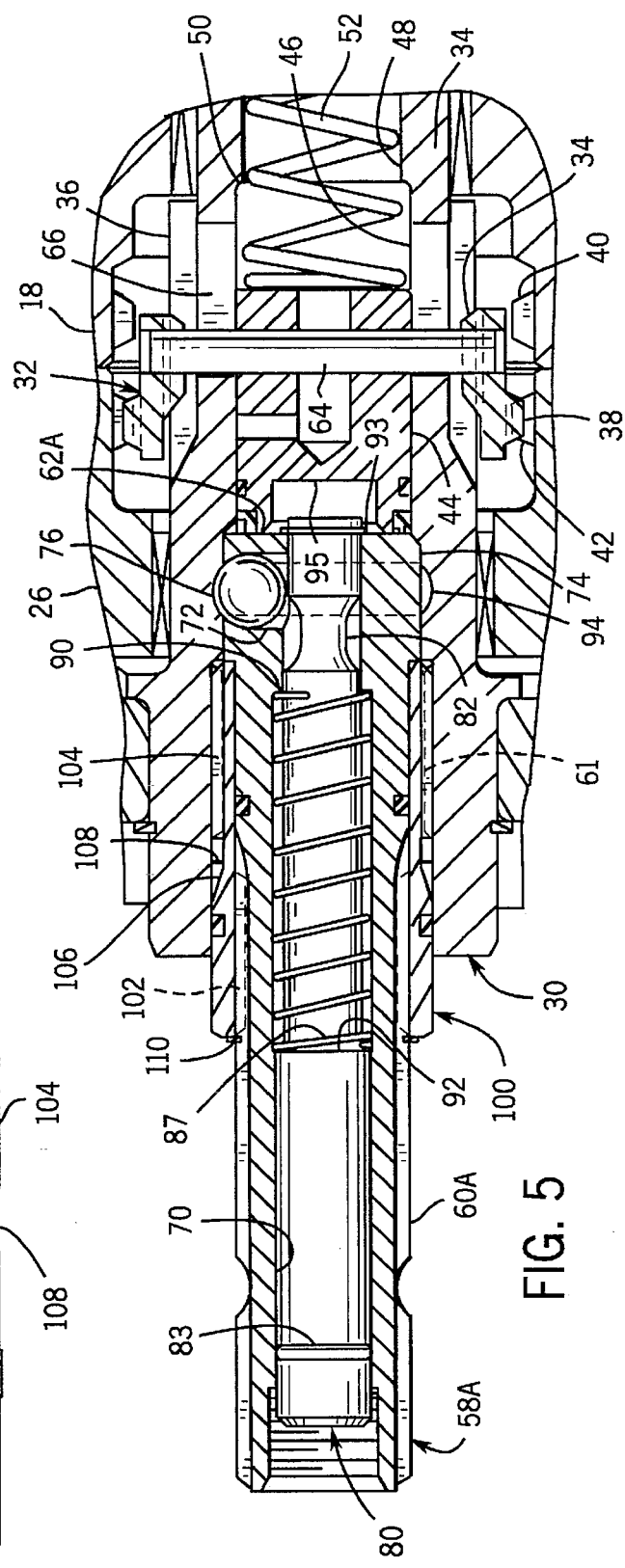
FIG. 5 is a cross-sectional view of the power take-off unit illustrating use of a connector with a reduced diameter, reduced length, 540 RPM power take-off shaft, which is shown in a locked position and retaining the shift collar in engagement with the 540 RPM gear.

When the PTO shaft 58 is removed as shown in FIG. 4, the spring 52 biases the clutch collar 32 in a distal or leftward direction toward the low speed gear 26 until the slide pin 64 engages a distal edge or stop 65 of the longitudinal slots 66 in the output shaft 30. If it is desired to shift to low speed operation, a PTO shaft 58A having a shortened length is inserted into the output shaft 30 as shown in FIG. 5. As a result, a proximal end 62A of the PTO shaft 58A bears against the piston 44 of the clutch collar 32, and is lengthwise sized such that the clutch collar 32 is positionally displaced into engagement with the low speed gear 26. As will be discussed in more detail below, a locking mechanism is provided for automatically locking the PTO shaft 58A into the locking position shown in FIG. 5, thereby securely maintaining the clutch collar 32 in the desired position for engagement with the low speed gear 26. To correlate the selected drive speed with the connection of the PTO shaft to an associated implement, the 1¾ PTO shaft 58 shown in FIGS. 1–4 is provided with 20 external splines 60 for high speed operation, and the 1⅜ inch diameter PTO shaft 58A shown in FIG. 5 is provided with six external splines 60A for low speed operation.

One aspect of the present invention is the mechanism for releasably locking the PTO shaft 58 or 58A in the appropriate location within the output shaft 30. Since the locking mechanisms are the same for the interchangeable PTO shafts 58 and 58A, the same reference numerals will be used for the components of the power take-off shafts 58 and 58A. The PTO shaft 58 has an inner bore 70 that axially extends the length of the shaft 58, and three circumferentially and equally spaced radial openings 72 are defined in a proximal end portion 74 of the shaft 58. As shown in FIG. 2A, a locking detent or ball 76 is guided within each one of the radial openings 72 for radial movement relative to the axis of the PTO shaft 58. Preferably, the radial openings 72 are staked to create a reduced diameter at 78 near the perimeter of the PTO shaft 58 in order to retain the locking balls 76 therein.

To actuate the locking balls 76 between the locking and unlocking positions, a locking pin 80 is arranged and axially movable within the inner bore 70 of the PTO shaft 58. The locking pin 80 has a circumferential channel 82 formed on a proximal end portion 84 for operable engagement with the locking balls 76. Preferably, the depth of channel 82 in the locking pin 80 is great enough to allow the locking balls 76 to move to an unlocked position, and the width of channel 82 is slightly greater than the diameters of the radial openings 72 in the PTO shaft 58. In a most preferred embodiment of the invention, and as designated in FIG. 2B, the channel 82 is defined by inclined proximal and distal wall portions 84, 86 which act as cam surfaces and converge toward a center neck portion 88 having a generally uniform diameter.

Preferably, the locking pin 80 is biased to releasably retain the locking balls 76 in the locking position and prevent relative axial movement of the PTO shaft 58 and output shaft 30. In order to bias the locking pin 80 axially toward a normally locked distal or leftward position as illustrated in FIGS. 1 and 2, a spring 87 acts between the locking pin 80 and the PTO shaft 58. Preferably, the spring 87 surrounds a proximal portion of the locking pin 80 and is interposed between a proximal shoulder 90 of the PTO shaft bore 70 and a shoulder 92 of the locking pin 80. A retaining ring 93 is also provided on the proximal end of the locking pin 80 to limit the distal or leftward movement of the locking pin 80 under the influence of the spring 87. In addition, the locking pin 80 is provided with an annular seal 83 at its distal end to inhibit moisture and contaminants from entering between the bore 70 of the PTO shaft 58 and the external diameter of the locking pin 80.

In the locked position illustrated in FIGS. 1 and 2, the PTO shaft 58 is positioned such that the radial openings 72 are generally in axial alignment with a circumferential groove 94 in the output shaft 30. The locking pin 80 is biased in a leftward or distal direction to maintain the locking balls 76 in operable engagement with the groove 94, thus preventing relative axial movement between the PTO shaft 58 and the output shaft 30. Preferably, the locking balls 76 and groove 94 have substantially the same radius of curvature to provide a secure locking engagement. In addition, the end 62 of the 20-splined PTO shaft 58 bears against the piston 44, thereby automatically locating the shift collar 32 for engagement of the external clutch teeth 38 with the internal clutch teeth 40 of the associated high speed gear 18.

To unlock the PTO shaft 58 and remove it from the output shaft 30, an operator presses the locking pin 80 against the action of the spring 87 until the circumferential channel 82 of the locking pin 80 is generally in alignment with the radial openings 72 in the PTO shaft 58. As a result, the locking balls 76 are permitted to move radially inwardly and rest on the neck portion 88 of the locking pin channel 82 as shown in FIGS. 3 and 3A, thereby releasing the locking relationship between the PTO shaft 58 and the output shaft 30. Practically, the locking balls 76 are forced radially inwardly by operable engagement with the output shaft 30 as the PTO shaft 58 is withdrawn from the output shaft 30. When the shortened PTO shaft 58A is utilized as shown in FIG. 5, a chamber 95 is provided in the clutch collar 32 to accommodate the locking pin 80 in its unlocked or rightward position.

When the locking pin 80 is released as shown in FIG. 4, the spring 87 causes the locking pin 80 to move in a distal or leftward direction, thereby forcing the locking balls 76 radially outward by the camming action of the inclined proximal wall portion 84 of the locking pin channel 82. Of course, the reduced diameter of the radial openings 72 at the perimeter 78 of the PTO shaft 58 prevents inadvertent disassembly of the locking balls 76 from the PTO shaft 58. In addition, the leftward movement of the locking pin 80 is limited by the retainer ring 93.

An optional feature of the present invention is to provide a cap screw 96 as shown in FIGS. 3 and 3B for precisely displacing the locking pin 80 a desired axial distance. The cap screw 96 is adapted to be threadably inserted into an enlarged diameter, threaded distal portion 97 of the bore 70 in the PTO shaft 58. Preferably, the threaded distal portion 97 defines a radial step or shoulder 101 at a proximal end thereof which acts as a stop for the cap screw 96. When tightened, the cap screw 96 operably engages the locking pin 80 and axially moves the locking pin 80 in a proximal or rightward direction. As illustrated in FIG. 3B, the threaded distal portion 97 of the bore 70 preferably has a length such that complete tightening of the cap screw 96 against the shoulder 101 places the channel 82 in the locking pin 80 in general alignment with the radial openings 72 in the PTO shaft 58, thus ensuring that the locking balls 76 are in the desired unlocking position. The cap screw 96 and PTO shaft 58 can be provided with other configurations for precisely determining the amount the cap screw 96 axially displaces the locking pin 80. For example, the cap screw 96 can have a head and a predetermined length adapted to place the locking pin 80 in the desired location.

Preferably, the cap screw 96 is also adapted for connection to a slide hammer assembly (not shown). A threaded hole 99 is provided in the cap screw 96 for threadably receiving a slide rod (not shown) to which a hammer (not shown) is slidably connected. If binding of the PTO shaft 58 makes manual removal difficult, the cap screw 96 is completely tightened to ensure that the channel 82 on the locking pin 80 is axially positioned to allow the locking balls 76 to radially move to the unlocking position within the channel 82. The slide hammer is then threadably attached to the cap screw 96, and an operator forceably slides the hammer in a distal or leftward axial direction against a stop at the distal end of the slide rod, thereby providing an impact force which breaks the PTO shaft 58 free from the output shaft 30.

Figure 6:
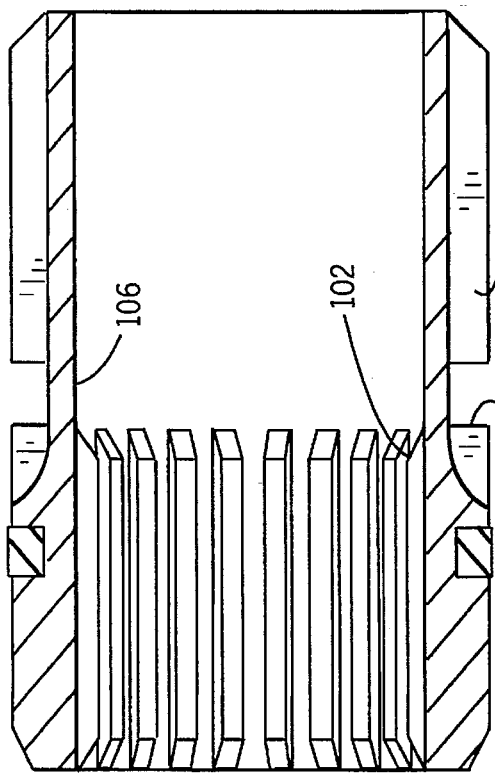
FIG. 6 is an enlarged, cross-sectional view of the connector shown in FIG. 5.

Another aspect of the present invention is to provide a break-away connector sleeve 100 which provides torque overload protection when a 1⅜ inch diameter PTO shaft 58A is utilized for operating an associated implement. The connector sleeve 100 allows a PTO shaft 58A to disengage from the output shaft 30 when binding of the PTO shaft 58A prevents rotation thereof with the positively driven output shaft 30. As shown in FIGS. 5 and 6, the connector sleeve 100 has internal splines 102 and external splines 104 which form a sliding spline connection with the external splines 60A on the PTO shaft 58A and the internal splines 61 on the output shaft 30, respectively, to prevent relative rotational movement during normal operation.

As shown in FIG. 6, the internal and external splines 102, 104 of the connector sleeve 100 are longitudinally spaced relative to each other to create an unsplined ring portion 106 of the connector sleeve 100. In addition, a circumferential relief notch 108 is formed in the ring portion 106 to act as a stress concentrator. Thus, the connector sleeve 100 is configured to fail at the ring portion 106 when binding of the PTO shaft 58A prevents rotation thereof with the positively driven output shaft 30, thereby disengaging the PTO shaft 58A and preventing damage to other components of the power take-off assembly 10.

In addition to providing a break-away feature, the connector sleeve 100 allows the smaller diameter PTO shaft 58A to be utilized with the same output shaft configuration as shown in FIGS. 1–4. Even if the relief notch 108 were not provided and the internal and external splines 102, 104 extended the entire length of the connector sleeve 100, the smaller diameter PTO shaft 58A can be quickly and easily interchanged with the high speed PTO shaft 58 by merely attaching the connector sleeve 100 to the PTO shaft 58A for engagement with the internal splines 61 on the output shaft 30. A snap-ring 110 (FIG. 5) can also be provided to further secure the connector sleeve 100 to the PTO shaft 58A.

Figure 7:
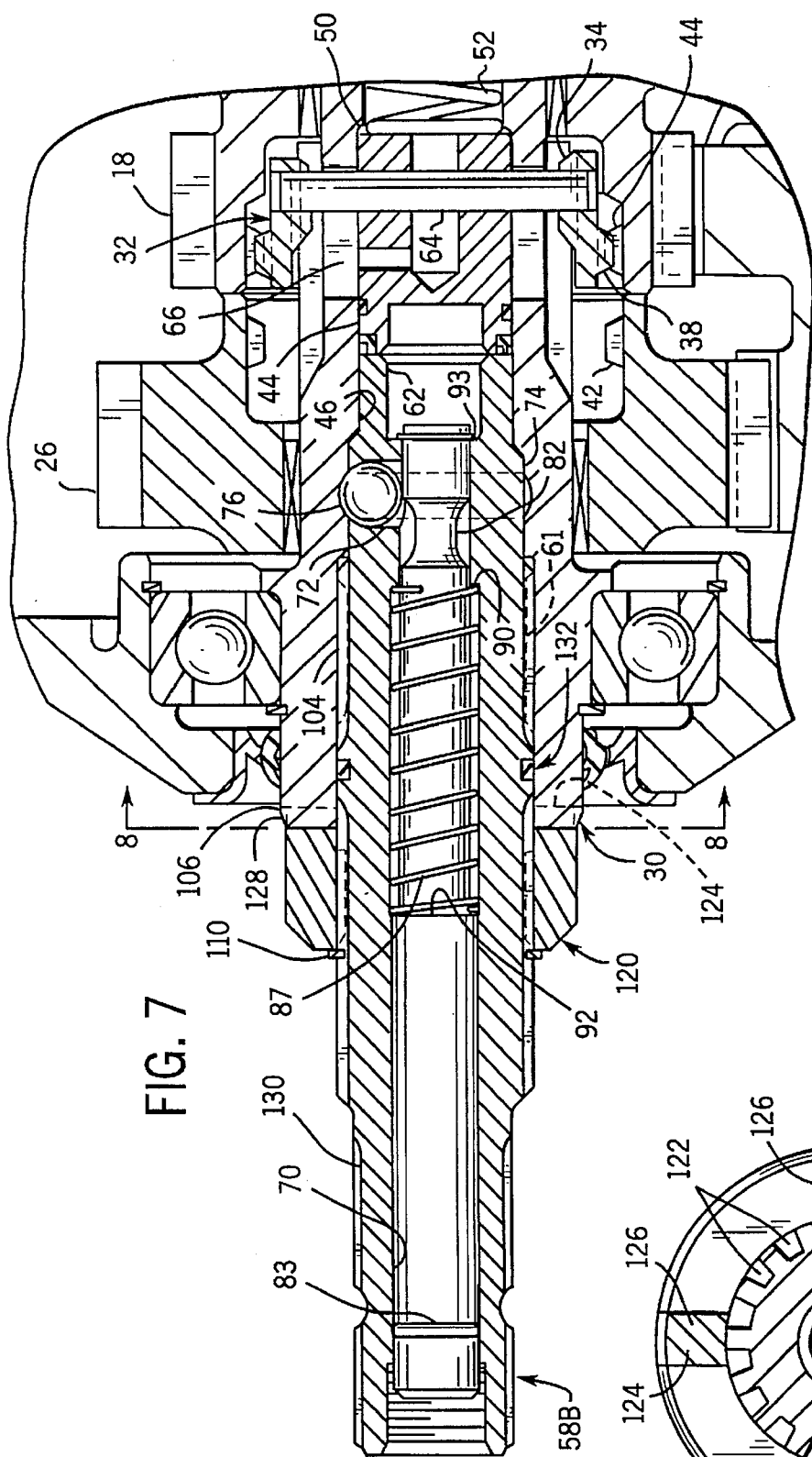
FIG. 7 is a cross-sectional view of an alternative embodiment of a connector illustrating use with a reduced diameter 1000 RPM power take-off shaft, which is shown in a locked position and retaining the shift collar in engagement with the 1000 RPM gear.
Figure 8:
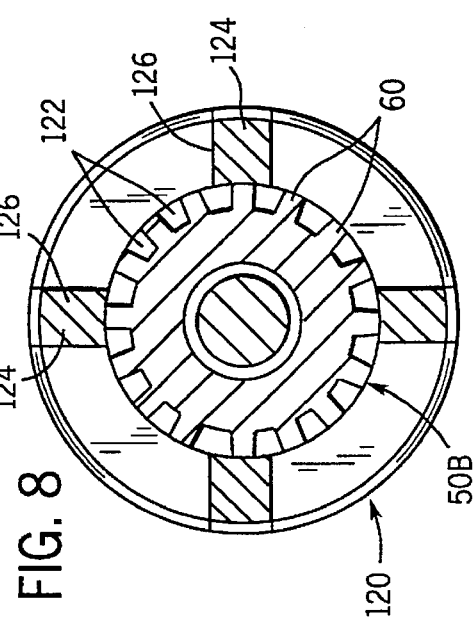
FIG. 8 is a cross-sectional view of the connector taken along the line 8—8 in FIG. 7.

In an alternative preferred embodiment of the invention, a break-away collar 120 is provided as shown in FIG. 7 instead of the connector sleeve 100. As with the connector sleeve 100, the collar 120 allows the PTO shaft 58B to disengage from the output shaft 30 when binding of the PTO shaft 58B prevents rotation thereof with the positively driven output shaft 30. As shown in FIGS. 7 and 8, the collar 120 has internal longitudinal splines 122 which form a sliding spline connection with the external splines 60 on the PTO shaft 58B. In addition, the collar 120 has four circumferentially spaced teeth 124 extending axially for engagement with corresponding recesses 126 formed on an end 128 of the output shaft 30. Thus, the collar 120 is configured to prevent relative rotation of the PTO shaft 58B and the output shaft 30 during normal operation, yet fail at the teeth 124 when binding of the PTO shaft 58B prevents rotation thereof with the positively driven output shaft 30. As a result of such failure, the PTO shaft 58B is disengaged from the output shaft 30 to prevent damage to other components of the power take-off assembly 10. Preferably, the collar is made of powdered metal which causes the teeth 124 to sheer before the other components of the power take-off assembly 10 are damaged.

Various other modifications can be made to the PTO shaft 58B to accommodate the use of the collar 120. For example, instead of providing a connector sleeve to compensate for a smaller diameter PTO shaft as shown in FIG. 5, the PTO shaft 58B in FIG. 7 is merely formed with a reduced diameter connecting end 130. In addition, an O-ring 132 is provided on the PTO shaft 58B to inhibit fluid and debris from entering the output shaft 30.

The operation of the foregoing preferred embodiments of the invention will now be described with reference to FIGS. 2–5. In FIG. 2, the PTO shaft 58 is in a locked position and has a length which positions the clutch collar 32 for engagement with the high speed gear 18. In this locking position, the locking pin 80 is biased in a distal or leftward direction by the spring 87 so that the locking balls 76 are securely locked within the groove 94 of the output shaft 30. At the same time, the piston 44 of the clutch collar 32 is biased distally or leftwardly against the end 62 of the PTO shaft 58, so that the external clutch teeth 38 operably engage the internal clutch teeth 40 of the high speed gear 18. Thus, when the engine clutch is engaged, the drive gear 12 (FIG. 1) drives the high speed gear 18 at a constant speed of 1000 rpm, which in turn drives the low speed gear 26 at a constant speed of 540 rpm through intermediate gear 20. Since the clutch collar 32 is only engaged with the high speed gear 18, however, the output shaft 30 and PTO shaft 58 are rotated at 1000 rpm, while the low speed gear 26 freely rotates about the output shaft 30 at a speed of 540 rpm.

If it is desired to change to an operating speed of 540 rpm, the engine clutch is disengaged and an operator axially depresses the locking pin 80 in a proximal or rightward direction against the action of the spring 87 as shown in FIG. 3. This axial displacement of the locking pin 80 allows the locking balls 76 to move radially inwardly from engagement with the groove 94 in the output shaft 30 and within the circumferential channel 82 of the locking pin 80. Alternatively, the cap screw 96 can be threadably inserted into the distal portion 97 of the PTO shaft bore 70 to place the locking pin 80 and locking balls 76 in the unlocking position. In order to remove the PTO shaft 58, it is pulled from the output shaft 30 while the locking pin 80 is axially depressed to retain the locking balls 76 in the withdrawn unlocking position. In practice, however, the locking pin 80 can be released after the locking balls 76 clear the groove 94 in the output shaft 30.

FIG. 4 illustrates the PTO shaft 58 completely removed from the output shaft 30 with the locking pin 80 released. When the PTO shaft 58 is removed, the spring 52 automatically forces the clutch collar 32 to move in a distal or leftward axial direction until the slide pin 64 engages an edge of the longitudinal slots 66 in the output shaft 30. In this position, the external clutch teeth 38 of the clutch collar are in operable engagement with the internal clutch teeth 42 on the low speed gear 26.

Once the 1000 rpm PTO shaft 58 is removed, a six-splined, 1⅜ inch diameter PTO shaft 58A is located having a shortened end 62A for operation at 540 rpm. Prior to insertion into the output shaft hub portion 46, the connector sleeve 100 is slidably attached to the PTO shaft 58A and secured thereto by the snap-ring 110. The locking pin 80 is then pressed to move the locking balls 76 radially inwardly to the unlocking position, and the PTO shaft 58A and connector sleeve 100 are inserted in the hollow hub portion 44 of the output shaft 30. When the radial openings 72 are approximately aligned with the groove 94 in the output shaft 30, or when the end 62A of the PTO shaft 58A bottoms out against the shoulder 63 of the output shaft 30, the locking pin 80 is released as shown in FIG. 5. As a result, the spring 87 causes the locking pin 80 to move in a distal or leftward axial direction, thereby forcing the locking balls 76 radially outward by the camming action of the inclined proximal wall portion 84 of the locking pin channel 82. Alternatively, the locking pin 80 can be released during insertion of the PTO shaft 58A, whereupon the locking balls 76 will automatically be forced radially outward or "snapped" into engagement with the output shaft groove 94 when they reach the groove 94. In either event, the 540 rpm PTO shaft 58A is locked into position and has a length which positions the clutch collar 32 for engagement with the low speed gear 26. In this position, the piston 44 of the clutch collar 32 is biased against the end 62A of the PTO shaft 58A so that the external clutch teeth 38 operably engage the internal clutch teeth 42 of the low speed gear 26. Since the clutch collar 32 is only engaged with the low speed gear 26, the output shaft 30 and PTO shaft 58A are rotated at 540 rpm, while the high speed gear 18 freely rotates about the output shaft 30 at a speed of 1000 rpm.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. A power take-off unit of off-highway equipment such as a tractor, comprising: an output shaft having a hollow, internally splined hub portion adapted to axially receive an externally splined power take-off shaft to prevent relative rotational movement between the power take-off and output shafts;

a locking member supported within a radial opening in the power-take off shaft so as to be radially movable between an outer locking position, wherein said locking member is engageable with a recess formed in the hub portion of the output shaft to prevent relative axial movement between the power take-off shaft and the output shaft, and an inner unlocking position, wherein said locking member is disengaged from said recess in the output shaft to permit such relative axial movement; and an elongated actuator positioned within an inner bore of the power take-off shaft and having a cam surface thereon, said actuator being movable between a first position in which the actuator operably maintains the locking member in its locking position, and a second position which permits radial movement of said locking member to its unlocking position, whereupon return of said actuator to the first position causes the cam surface to operably engage the locking member to move said locking member to its locked position.

2. The power take-off unit of claim 1 wherein the actuator comprises a locking pin and the cam surface comprises a circumferential channel formed in an end portion of the locking pin.

3. The power take-off unit of claim 2 wherein the channel is defined by a distal wall portion and a radially outwardly facing inclined proximal wall portion.

4. The power take-off unit of claim 3 wherein the distal and proximal wall portions are inclined and converge toward each other.

5. The power take-off unit of claim 4 wherein the inclined distal and proximal wall portions converge toward a center neck portion having a uniform diameter.

6. The power take-off unit of claim 5 wherein the inclined distal and proximal wall portions are curved.

7. The mechanism of claim 5 wherein the channel in the locking pin has a width that is greater than an axial width of the radial opening in the power take-off shaft so that at least a potion of the locking member is within the channel in the unlocking position, whereby axial movement of the locking pin causes one of said distal and proximal wall portions to operably engage the locking member and move said locking member radially within the opening in the power take-off shaft.

8. The power take-off unit of claim 1 further comprising a bias member adapted to bias the actuator toward said first position.

9. The power take-off unit of claim 8 wherein the bias member comprises a spring surrounding a proximal portion of the actuator, said spring being interposed between a proximal shoulder of the power take-off shaft bore and a shoulder of the actuator located distally of said proximal shoulder.

10. The power take-off unit of claim 1 wherein the actuator comprises a locking pin and the bore in the power take-off shaft is defined as a generally cylindrical wall, and further comprising a seal between said locking pin and said wall.

11. The power take-off unit of claim 1 further comprising a plurality of circumferentially spaced locking balls supported within respective spaced radial openings in the power-take off shift.

12. The power take-off unit of claim 11 wherein said plurality of locking balls comprises three equally spaced balls supported within respective equally spaced radial openings in the power take-off shaft.

13. The power take-off unit of claim 11 wherein the recess in the hub portion of the output shaft is defined as a circumferential groove, whereby the locking balls are simultaneously radially movable between said outer locking position in which the locking balls are engageable with said groove to prevent relative axial movement between the power take-off shaft and the output shaft, and said inner unlocking position in which the locking balls are disengaged from said groove to permit such relative axial movement.

14. A locking mechanism for releasably fixing an externally splined power take-off shaft to an output shaft of off-highway equipment such as a tractor, said output shaft having a hollow, internally splined hub portion adapted to axially receive the externally splined power take-off shaft to prevent relative rotational movement between the power take-off and output shafts, said locking mechanism comprising:

a locking member adapted to be supported within a radial opening in the power-take off shaft so as to be radially movable between an outer locking position, wherein said locking member is engageable with a recess formed in the hub potion of the output shaft to prevent relative axial movement between the power take-off shaft and the output shaft, and an inner unlocking position, wherein said locking member is disengaged from said recess in the output shaft to permit such relative axial movement;

an elongated actuator adapted to be positioned within an inner bore of the power take-off shaft and having a cam surface thereon, said actuator being movable between a first position in which the actuator operably maintains the locking member in its locking position, and a second position which permits radial movement of said locking member to its unlocking position, whereupon return of said actuator to the first position causes the cam surface to operably engage the locking member to move said locking member to its locked position; and a cap screw adapted to be threadably inserted into a distal end of the power take-off shaft bore and operably engage the actuator to axially move said actuator in a proximal direction.

15. The mechanism of claim 14 wherein said cap screw is adapted to place the actuator in the first position, and wherein said cap screw is adapted for connection to a slide hammer assembly, whereby tightening of said cap screw places the locking member in the desired unlocking position, thereby allowing operation of said slide hammer assembly to forceably remove the power take-off shaft when binding otherwise prevents manual removal.

16. A power take-off unit of off-highway equipment such as a tractor, comprising: an output shaft having a hollow, internally splined hub portion adapted to axially receive an externally splined power take-off shaft to prevent relative rotational movement between the power take-off and output shafts;

a locking pin axially movable within an inner bore of the power take-off shaft and having a circumferential channel formed on a proximal end portion thereof;

a plurality of circumferentially spaced locking balls supported within respective spaced radial openings in the power-take off shaft so as to be simultaneously radially movable between outer locking positions, wherein said locking balls are engageable with a circumferential groove formed in the hub portion of the output shaft to prevent relative axial movement between the power take-off shaft and the output shaft, and inner unlocking positions, wherein said locking balls are positioned within the channel in the locking pin to permit such relative axial movement; and a bias member acting between the locking pin and the power take-off shaft for biasing the locking pin axially toward a first position in which an outer surface of the locking pin engages and operably maintains the locking balls in their locking position, whereby the locking pin is axially movable against the action of the bias member to a second position in which the channel in the locking pin is in substantial alignment with the radial openings in the power take-off shaft to permit radial movement of said locking balls to their unlocking position.

17. The power take-off unit of claim 16 wherein the width of the channel in the locking pin is greater than the axial width of the radial openings in the power take-off shaft, and the channel is defined by inclined distal and proximal wall portions which converge toward a center neck portion having a generally uniform diameter such that a portion of the locking balls can fit within the channel in the unlocking position, whereby axial movement of the locking pin causes one of said distal and proximal wall portions to operably engage the locking balls and move said locking balls radially within the radial openings in the power take-off shaft to the locking positions.

18. The power take-off unit of claim 17 wherein the inclined distal and proximal wall portions are curved.

19. The power take-off unit of claim 16 wherein the bias member comprises a spring surrounding a proximal portion of the locking pin, said spring being interposed between a proximal shoulder of the power take-off shaft bore and a shoulder of the locking pin located distally of said proximal shoulder.

20. The power take-off unit of claim 16 wherein said plurality of balls comprises three equally spaced balls supported within respective equally spaced radial openings in the power take-off shaft.

21. A locking mechanism for releasably fixing an externally splined power take-off shaft to an output shaft of off-highway equipment such as a tractor, said output shaft having a hollow, internally splined hub portion adapted to axially receive the externally splined power take-off shaft to prevent relative rotational movement between the power take-off and output shafts, said locking mechanism comprising:

a locking pin adapted to be axially movable within an inner bore of the power take-off shaft and having a circumferential channel formed on a proximal end portion thereof;

a plurality of circumferentially spaced locking balls adapted to be supported within respective spaced radial openings in the power-take off shaft so as to be simultaneously radially movable between outer locking positions, wherein said locking balls are engageable with a circumferential groove formed in the hub portion of the output shaft to prevent relative axial movement between the power take-off shaft and the output shaft, and inner unlocking positions, wherein said locking balls are positioned within the channel in the locking pin to permit such relative axial movement;

a bias member adapted to be acting between the locking pin and the power take-off shaft for biasing the locking pin axially toward a first position in which an outer surface of the locking pin engages and operably maintains the locking balls in their locking position, whereby the locking pin is axially movable against the action of the bias member to a second position in which the channel in the locking pin is adapted to be in substantial alignment with the radial openings in the power take-off shaft to permit radial movement of said locking balls to their unlocking position; and a cap screw adapted to be threadably inserted into a distal end of the power take-off shaft bore and operably engage the locking pin to axially move said locking pin in a proximal direction, said cap screw having a length such that the channel in the locking pin is generally aligned with the radial openings in the power take-off shaft when the cap screw is completely tightened, thus ensuring that the locking balls are in the desired unlocking position within the channel.

22. The mechanism of claim 21 wherein the cap screw is adapted for connection to a slide hammer assembly, whereby said slide hammer assembly is operated when the cap screw is completely tightened to forceably remove the power take-off shaft when binding otherwise prevents manual removal.

23. In combination with a power take-off unit of a tractor having an output shaft for delivering power to agricultural implements, a power take-off shaft assembly releasably fixed to said output shaft, comprising:

a power take-off shaft having an inner bore and a plurality of circumferentially spaced radial openings formed in a proximal end portion thereof, said power take-off shaft being positioned within a hollow hub portion of the output shaft such that said radial openings are generally in alignment with a circumferential groove formed in said hub portion;

a plurality of locking balls supported within respective ones of said radial openings for radial movement relative to the axis of the power take-off shaft;

a locking pin axially movable within said inner bore and having a circumferential channel formed in a proximal end portion thereof for receiving said locking balls; and a spring acting between the locking pin and the power take-off shaft for biasing the locking pin axially toward a normally locked position in which said locking balls are maintained in operable engagement with the groove in the hub portion of the output shaft to prevent relative axial movement between the power take-off shaft and the output shaft;

whereby the locking pin is axially movable against the action of the spring from said locked position to an unlocked position in which the channel of the locking pin is generally in alignment with the radial openings in the power take-off shaft to permit inward radial movement of said locking balls from operable engagement with the output shaft to operable engagement with said locking pin channel, thereby permitting removal of the power take-off shaft from the output shaft, said channel having an inclined surface adapted to move the locking balls radially outward upon release and resulting axial movement of the locking pin.

24. The assembly of claim 23 wherein the width of the channel in the locking pin is greater than the axial width of the radial openings in the power take-off shaft, and the channel is defined by inclined distal and proximal wall portions which converge toward a center neck portion having a uniform diameter such that the locking balls can rest on said neck portion in the unlocked position.

25. The assembly of claim 23 wherein the spring is positioned to bias the locking pin in a distal direction so that pressing a distal end of the locking pin moves said locking pin to the unlocked position.

26. The assembly of claim 23 further comprising a cap screw adapted to be threadably inserted into a distal end of the power take-off shaft bore and operably engage the locking pin to axially move said locking pin in a proximal direction, said cap screw having a length such that the channel in the locking pin is generally aligned with the radial openings in the power take-off shaft when the cap screw is completely tightened, thus ensuring that the locking balls are in the desired unlocking position within the channel.

27. The assembly of claim 26 wherein the cap screw is adapted for connection to a slide hammer assembly, whereby said slide hammer assembly is operated when the cap screw is completely tightened to forceably remove the power take-off shaft when binding otherwise prevents manual removal.

28. A power take-off assembly, comprising:

a power take-off shaft having external splines;

an output shaft adapted to be positively driven and having a hollow hub portion for receiving the power take-off shaft;

a connector interconnecting the power take-off shaft and output shaft, said connector having internal splines forming a sliding spline connection with the external splines on the power take-off shaft; and a plurality of connecting elements forming a connection with the output shaft to prevent relative rotation of the power take-off shaft and the output shaft while allowing rotational movement as a unit; means for breaking said connector when binding of the power take-off shaft prevents rotation thereof as a unit with the positively driven output shaft.

29. The assembly of claim 28 wherein the connector is made of a softer material than the power take-off shaft and output shaft.

30. The assembly of claim 28 wherein the connector comprises a collar having a plurality of circumferentially spaced teeth extending axially from a generally vertical face thereof, said teeth adapted to engage a plurality of corresponding recesses formed on a generally vertical end of the output shaft and configured to break when binding of the power take-off shaft occurs.

31. The assembly of claim 30 wherein the plurality of teeth comprises four equally spaced teeth.

32. The assembly of claim 28 wherein the connector comprises a sleeve having external splines thereon forming a sliding spline connection with internal splines on the output shaft, said external splines and internal splines of the connector being longitudinally spaced to create an unsplined ring portion of the sleeve, wherein the unsplined ring portion has a circumferential relief notch formed therein such that the connector sleeve fails at the relief notch when binding of the power take-off shaft prevents rotation thereof with the positively driven output shaft.

* * * * *